United States Patent [19]
Andorlini et al.

[11] Patent Number: 5,253,912
[45] Date of Patent: Oct. 19, 1993

[54] GRIPPER APPARATUS FOR ELECTRIC MOTOR COMPONENTS

[75] Inventors: Giuseppe Andorlini, Florence; Luciano Santandrea, Tavarnelle Val di Pesa, both of Italy

[73] Assignee: Axis USA, Inc., Marlborough, Mass.

[21] Appl. No.: 683,195

[22] Filed: Apr. 10, 1991

[51] Int. Cl.$^5$ ............................................. B25J 15/08
[52] U.S. Cl. .................................. 294/119.1; 29/732; 294/88; 294/103.1; 294/902; 294/907
[58] Field of Search ...................... 294/86.4, 86.41, 88, 294/103.1, 104, 106, 115, 116, 119.1, 902, 907; 29/596, 598, 732, 759, 760; 414/739-741, 751, 753, 763, 771, 783; 901/36-39

[56] References Cited

U.S. PATENT DOCUMENTS

| | | | |
|---|---|---|---|
| 2,348,948 | 5/1944 | Allen | 242/13 |
| 3,903,593 | 9/1975 | Mason | 29/732 X |
| 3,924,816 | 12/1975 | Schubert et al. | 242/7.05 B |
| 4,256,429 | 3/1981 | Dwyer | 294/103.1 X |
| 4,466,768 | 8/1984 | Datseris et al. | 294/86.41 X |
| 4,645,411 | 2/1987 | Madwed | 294/106 X |
| 4,699,414 | 10/1987 | Jones | 294/119.1 |
| 4,707,013 | 11/1987 | Vranish | 294/119.1 |
| 4,839,961 | 6/1989 | Vermeer | 294/119.1 X |

FOREIGN PATENT DOCUMENTS

| | | |
|---|---|---|
| 182180 | 5/1986 | European Pat. Off. |
| 2904377 | 8/1980 | Fed. Rep. of Germany |
| 3126873 | 1/1983 | Fed. Rep. of Germany ... 294/86.41 |
| 239558 | 10/1986 | Fed. Rep. of Germany |
| 3806333 | 9/1989 | Fed. Rep. of Germany |
| 1399116 | 5/1988 | U.S.S.R. ............................ 294/86.41 |

Primary Examiner—Johnny D. Cherry
Attorney, Agent, or Firm—Jeffrey H. Ingerman; Karen G. Horowitz

[57] ABSTRACT

Gripper apparatus for electric motor components that can be used to grip components of different sizes, and that can rotationally index electric motor components of different sizes, is provided. The gripper apparatus has two oppositely facing gripper arms with complementary V-shaped faces sized to accommodate a range of sizes of components. The arms are moved together in unison to center and grip the component. After the component has been gripped, an indexing pawl rotates the component. A tooth is urged against the component and stops the rotation when it enters a depression or slot in the component, indicating that the desired angular position has been reached.

27 Claims, 9 Drawing Sheets

GRIPPER APPARATUS FOR ELECTRIC MOTOR COMPONENTS

BACKGROUND OF THE INVENTION

This invention relates to gripper apparatus for transferring electric motor components in both directions between a conveyor of an electric motor component production line and individual workstations along the production line. In particular, this invention relates to such gripper apparatus which can accommodate components of various sizes with little or no special setup to vary the size, and to such gripper apparatus having integral apparatus for rotating components to desired angular orientations.

In production lines for electric motor components—e.g., production lines for armatures or stators—it is customary for the components, in their various stages of formation, to travel along a conveyor, alongside of which are disposed various workstations for performing the different operations necessary to form the components. In such a production line, the component is removed from the conveyor by appropriate robotic or other transfer apparatus, moved to the workstation and held there while that workstation's operation is performed, and then returned to the conveyor.

The transfer apparatus usually includes a gripper for actually picking up and holding the component. Frequently, the gripper also rotationally indexes the component if the particular workstation requires a particular angular orientation of the component to perform its operation.

When assembling motors of different sizes, it is usually necessary to reconfigure the production line to accommodate the different-sized components, such as armatures. Such reconfiguration includes removing the grippers at each workstation and replacing them with grippers of a different size. Grippers that can handle more than one size are not generally available. Providing a gripper that can handle components of more than one size is particularly complicated when the component must be rotationally indexed. Rotational indexing is frequently measured in the case of armatures by the positions of the core slots, which have a defined angular spacing. However, in armatures of different sizes, the angular spacing of the core slots can differ.

It would be desirable to be able to provide gripper apparatus for electric motor components that can be used to grip components of different sizes.

It would also be desirable to be able to provide such gripper apparatus that can rotationally index electric motor components of different sizes.

SUMMARY OF THE INVENTION

It is an object of this invention to provide gripper apparatus for electric motor components that can be used to grip components of different sizes.

It is also an object of this invention to provide such gripper apparatus that can rotationally index electric motor components of different sizes.

In accordance with this invention, there is provided gripper apparatus for gripping an electric motor component. The gripper apparatus accommodates electric motor components of varying sizes and includes first and second gripper arms for contacting the component. Each of the gripper arms has a gripper surface shaped to prevent translation of the component. At least one of the gripper arms is movable toward and away from the other gripper arm. The apparatus also includes means for moving the at least one gripper arm for causing the gripper arms to contact the component surface. The gripper surfaces are shaped so that movement of one gripper arm toward and away from the other gripper arm allows the gripper arms to accommodate components of varying sizes.

The invention also provides, in cases where rotational indexing of the component is required, that the gripper surface is also shaped to allow rotation of the component about the component axis. Such apparatus also includes indexing means for engaging the component surface and causing rotation of the component about the component axis, stopping means for stopping rotation of the component by the indexing means after the indexing means has rotated the component to a desired position, and disengaging means associated with the stopping means for disengaging the indexing means when the stopping means stops the rotation.

BRIEF DESCRIPTION OF THE DRAWINGS

The above and other object and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention is a gripper apparatus, for use in conventional robotic or other transfer machines, having two opposed gripper arms. Each gripper arm has a gripper surface of a shape that allows the gripper to grip components of a range of sizes between a minimum and maximum expected size. The shape of the gripper surface also provides a camming action that centers the axis of the component along the axis of the gripper apparatus regardless of the size of the component or its height above the conveyor. One preferred surface configuration for achieving these results is a V-shaped or modified V-shaped surface.

Once the component is centered along the gripper axis, the gripper can also rotate the component to a desired angular orientation, again without regard to the size of the component. This is accomplished by providing appropriate stop means to stop rotation and disengage the indexing means when the desired angular position is reached. In the preferred embodiments this is achieved by providing a sensing tooth that is urged toward the component surface and activates a switch when it encounters and enters an appropriate depression or slot in the component surface.

The construction and operation of a first preferred embodiment 10 of a gripper apparatus according to the present invention is illustrated in FIGS. 1-8. Although the embodiments described below are discussed in connection with the production of armatures, it should be understood that the invention applies equally to the production of other motor components, such as stators.

Figure 1:
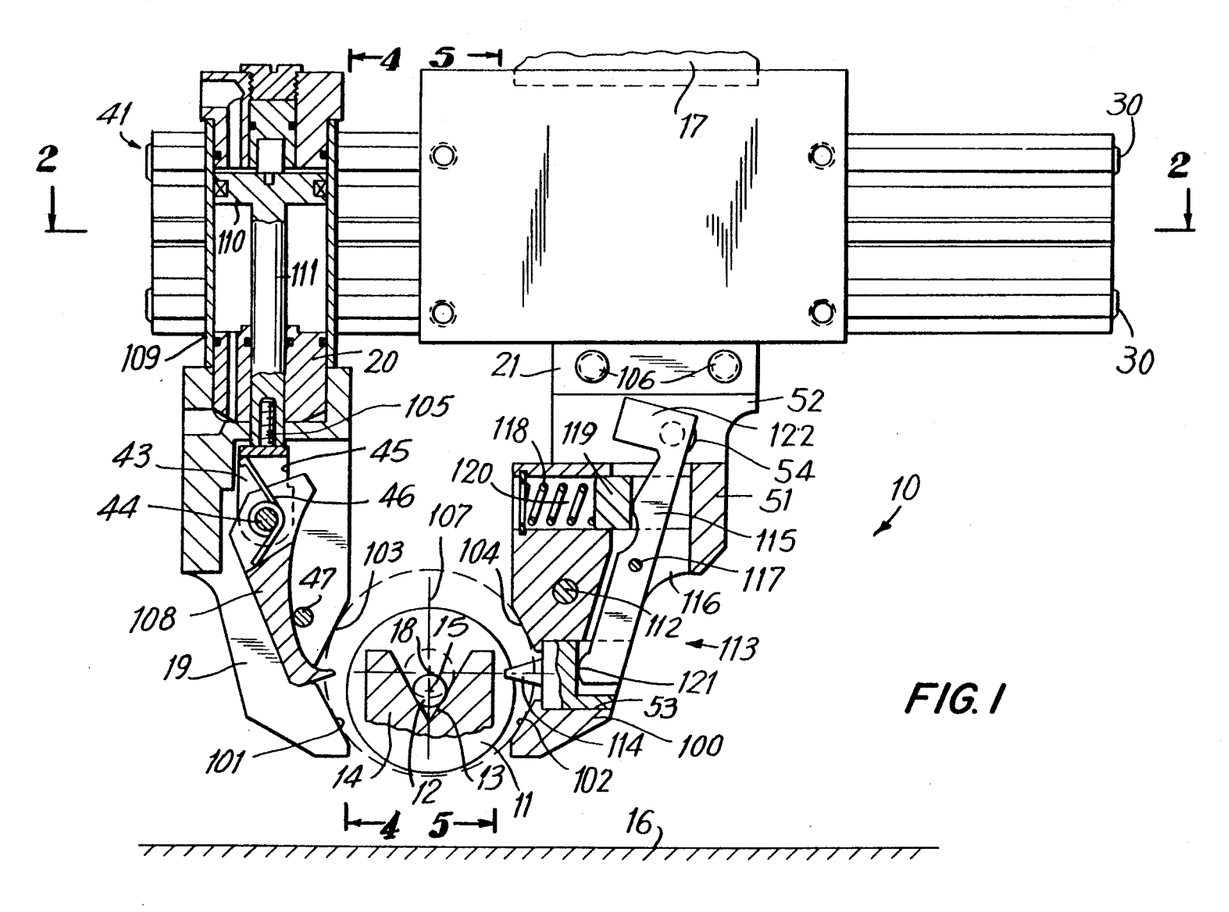
FIG. 1 is a side elevational view, partly in section, of a first preferred embodiment of gripper apparatus according to the present invention, taken along the direction of the longitudinal axis of an armature to be gripped.

An armature having a core 11 and shaft 12 is carried with the ends of shaft 12 bearing in opposing seats 13 of a conveyor device 14. In mixed production lines or in lines which can be converted for processing armatures of different core sizes, conveyor 14 may carry armatures having different core sizes. Shaft 12 of the armature can also vary in diameter. Variations in the diameter of shaft 12 can cause the longitudinal axis 15 of different armatures to be positioned by conveyor 14 at different heights above a reference level 16. Gripper apparatus 10 must be able to grip the armatures regardless of their core diameters or the height of axis 15 above level 16.

Apparatus 10 is positioned by conventional robotic transfer device 17 so that its own longitudinal axis 18, defined by gripping members 19, 100 is parallel to longitudinal axis 15 of the armature. The gripper is then lowered to a predetermined height, which will be the same for all core sizes and shaft diameters to be transferred, until gripping portions 19, 100 surround armature core 11 to be gripped.

Gripping members 19, 100 are then moved towards each other along a direction which is perpendicular to axis 18 of gripper apparatus 10. As gripping members 19, 100 move toward each other, respective angled surfaces 101, 102 of gripping members 19, 100 come into contact with core 11, and perform a camming action that causes the armature to be raised so that its axis 15 is centered along longitudinal axis 18 of gripper apparatus 10. In order to assure that the appropriate camming action will take place, it is only necessary to assure that axis 15 is above the lowermost ends of surfaces 101, 102. This is easily accounted for as long as the smallest expected armature size is known in advance. Similarly, gripping members 19, 100 are sized so that longitudinal axis 18 is never below longitudinal axis 15 of the largest expected armature.

Further opposing angled surfaces 103, 104 of the gripping members 19, 100 are provided so that the armature can be precisely positioned and securely gripped with its axis 15 coinciding with axis 18 of the gripper. The generally concave (here, V-shaped) nature of respective gripping surfaces 101, 103 and 102, 104 also allows for rotation of the armature about axes 15, 18 by the indexing means described below. The degree of concavity (here, the angle of the V-shape) is chosen so that the smallest expected armature size can be securely gripped before the extremities of opposed gripping surfaces 101, 102 and 103, 104 contact each other. At the same time the degree of concavity must be such that the largest expected armature size can be securely gripped without extremities of surfaces 101, 102, 103, 104 contacting the armature surface, which would prevent the armature from seating firmly against surfaces 101, 102, 103, 104.

Each of gripping members 19, 100 is mounted on a respective translating mechanism for movement toward and away from each other (see FIGS. 1-3), although it is possible to construct apparatus according to the invention in which only one of gripping members 19, 100 moves while the other is stationary.

Figure 2:
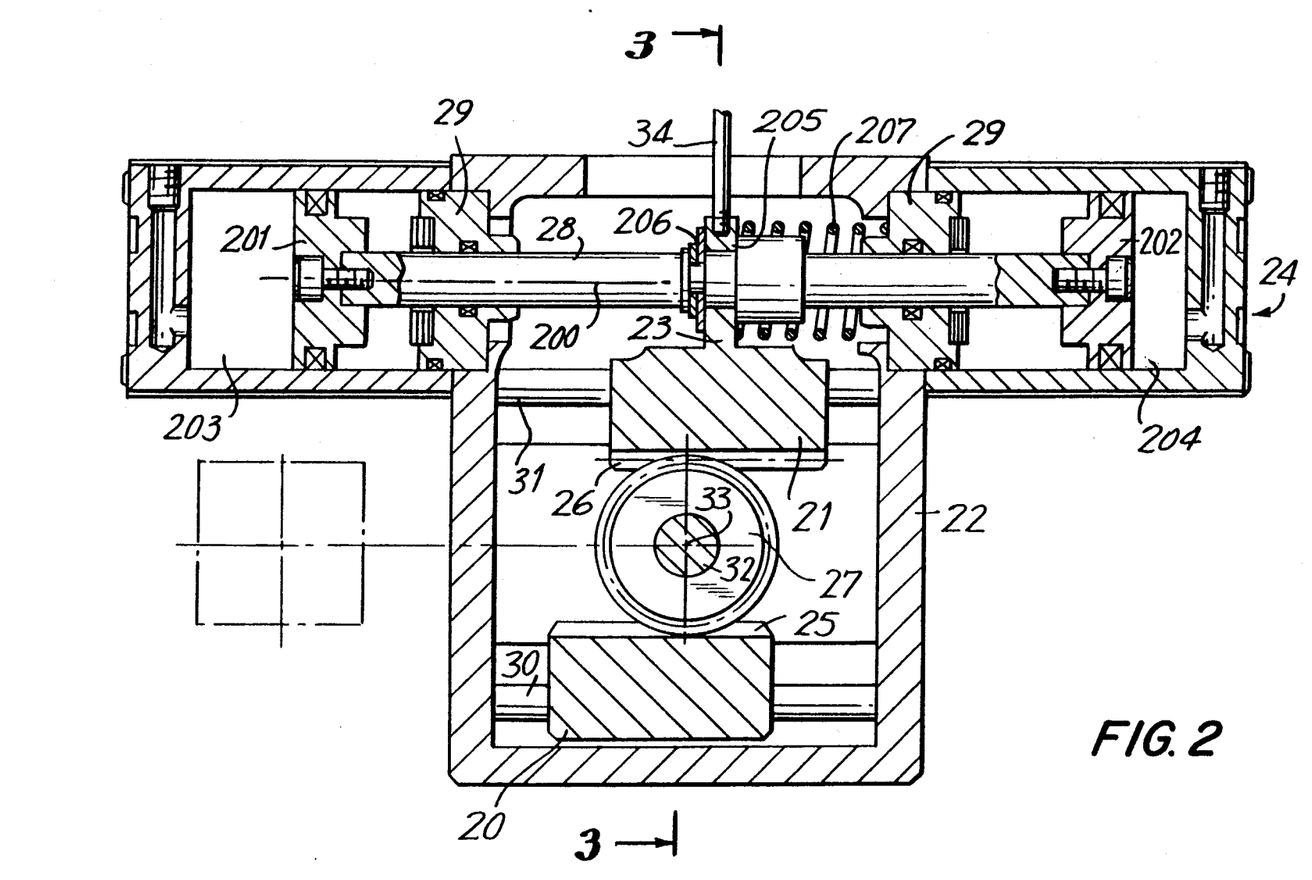
FIG. 2 is a horizontal cross-sectional view of the gripper apparatus of FIG. 1, taken from line 2—2 of FIG. 1.
Figure 3:
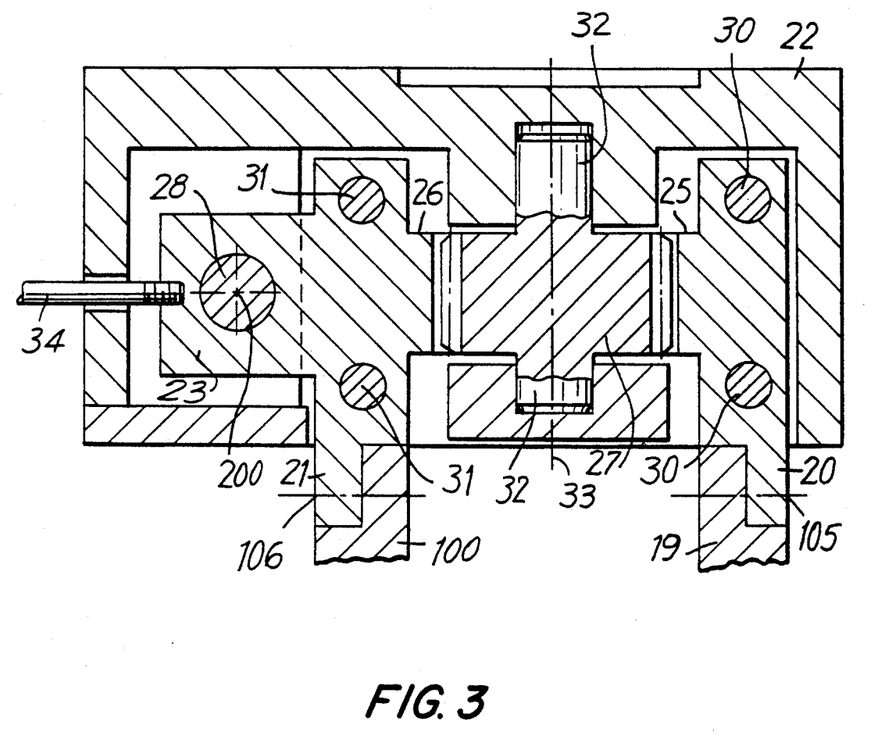
FIG. 3 is a fragmentary vertical cross-sectional view of the gripper apparatus of FIGS. 1 and 2, taken from line 3—3 of FIG. 2.

Gripping members 19, 100 are fixed to slides 20, 21, as by bolts, at 105, 106. Each slide 20, 21 is mounted on respective horizontal guide bars 30, 31 which are supported at their ends by the casing 22 of gripper apparatus 10. Slide 21 is connected by arm 23 to a driving device 24. Each of slides 20, 21 has a respective rack portion 25, 26 which engages a pinion 27. Pinion 27 is supported relative to casing 22 by pin 32 which can rotate about axis 33. Driving device 24 includes a shaft 28 which is supported on bushings 29 so that it can translate along axis 200. Piston members 201, 202 are fixed to opposite ends of shaft 28. These piston members slide in airtight chambers 203, 204, allowing translation of shaft 28 back and forth along axis 200. This translation can be caused by alternately pressurizing and depressurizing chambers 203, 204 behind pistons 201, 202 by means of appropriate conventional pneumatic equipment (not shown).

Slide 21 is rigidly fixed to shaft 28 by fixing arm 23 against a shoulder 205 of shaft 28 using a conventional elastic locking ring 206. When slide 21 is caused to translate by movement of shaft 28, pinion 27 is also rotated by engagement with rack 26, causing slide 20 to translate by engagement with rack 25. This allows gripping members 19, 100 to be moved toward and away from each other at the same rate in order to grip or release core 11 without shifting it along an axis transverse to axis 18. Precompressed spring 207 is mounted between casing 22 and arm 23 and has a spring constant chosen to guarantee a gripping action on armature core 11 even if the air pressure in chamber 204 is lost. The air pressure supplied is then chosen so that the combined force of spring 207 and the air pressure causes gripping numbers 19, 100 to grip core 11 securely, but not so tightly that core 11 cannot be rotated within V-shaped gripping surface 101-104.

Figure 4:
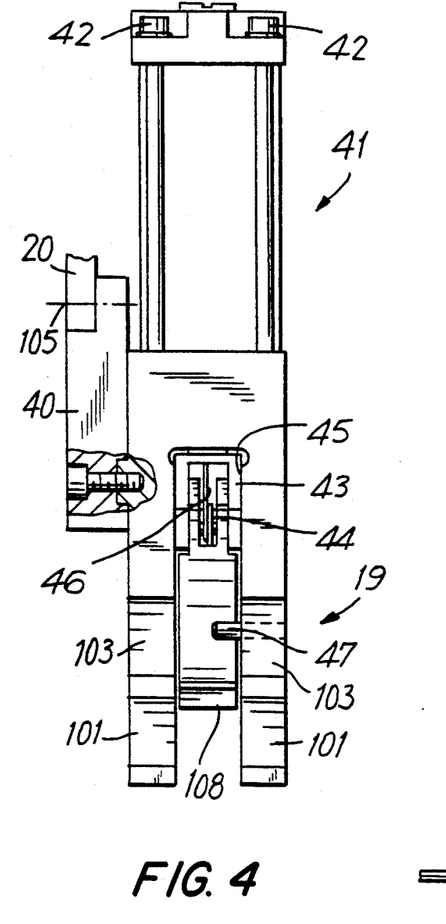
FIG. 4 is a vertical cross-sectional view of the gripper apparatus of FIGS. 1-3, taken from line 4—4 of FIG. 1.

Gripping member 19 has a plate 40 which is fixed to the main body of gripping member 19 and connects gripping member 19 to slide 20 by means of bolts at 105. The thickness and position of plate 40 allows gripping member 19 to be centered along axis 107 of gripper apparatus 10. Gripping member 19 has gripping surfaces 101, 103 as described above. The combined surface area of the V-shaped gripping surface is chosen so that correct contact pressure and stability can be maintained during gripping and transfer of the armature. Gripping member 100, which will be described below, has opposing gripping surfaces 102, 104, also as described above, which have a combined surface area chosen to meet the same conditions.

Gripping member 19 also includes an air cylinder arrangement 41 for actuating an indexing pawl 108. Arrangement 41 includes a cylindrical sleeve 109 fixed to gripping member 19 by means of bolts 42. Piston member 110 fixed to shaft 111 is caused to slide back and forth in sleeve 109 by passing pressurized air through appropriate feed bores (not shown). Shaft 111 is connected to pawl 108 by means of fork member 43. Pawl 108 can swivel on pin 44 of fork member 43. Pawl 108 and fork member 43 sit in a slot 45 in gripping member 19. As described below, slot 45 allows movement of pawl 108 and other members during indexing operations.

Pretensioned spring 46 mounted on pin 44 biases pawl 108 towards the armature core. Pin 47 fixed to gripping member 19 engages a camming surface of pawl 108. As explained more fully below, this is required to control the motion of pawl 108 about pin 44 under the biasing action of spring 46 when shaft 111 is retracted after an indexing operation. This guarantees that pawl 108 returns to the desired rest position, as shown in FIG. 1, after an indexing operation.

Gripping member 100 is mounted to swivel on pins 50 of bracket member 51. Bracket member 51 fixes gripping member 100 to slide 21 by means of extension 52 and bolts 106. The position and thickness of extension 52 guarantee that the axis of gripping member 100 is centered on axis 107 of gripper apparatus 10.

After gripper apparatus 10 has been assembled, a trial component of precisely known dimensions can be caused to be gripped by gripping members 19, 100. Once this has been accomplished, gripping member 100 is permanently pinned (see pin 112) to bracket member 51 so that during normal operation it is prevented from swivelling about pin 50. This compensates for machining errors and tolerance deviation which can occur during manufacturing of the various parts of gripper apparatus 10.

Figure 5:
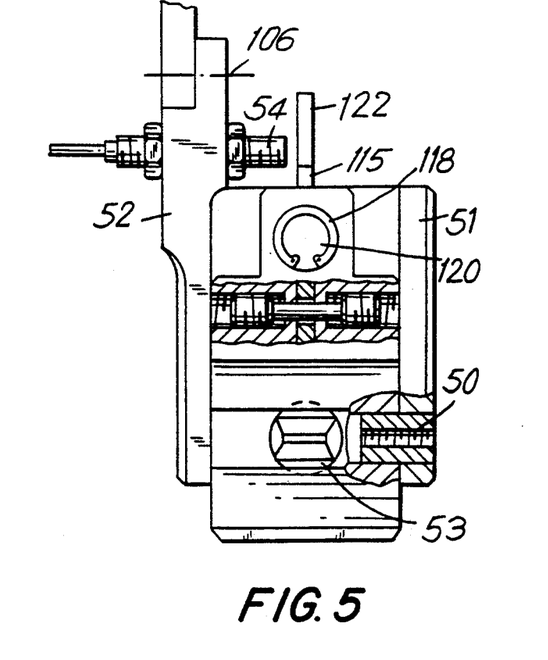
FIG. 5 is a fragmentary vertical cross-sectional view of the gripper apparatus of FIGS. 1-4, taken from line 5—5 of FIG. 1.

Gripping member 100 also includes an index sensing tooth mechanism 113. Mechanism 113 includes an index sensing tooth 114 which slides in a bore 53 of gripping member 100. Lever 115 sits in a slot 116 of gripping member 100. Lever 115 swivels about pin 117. A precompressed spring 118, which biases a cursor 119 for engaging and pushing lever 115, sits in a bore 120 of gripping member 100. This causes end 121 of lever 115 to push index sensing tooth 114 towards the armature.

Enlarged end 122 of lever 115, remote from end 121, engages a proximity switch 54, thereby determining the position of tooth 114 during indexing operations.

Indexing operation of gripper apparatus 10 will now be described.

When an armature is centered in gripper apparatus 10 by supplying air to chamber 204, thereby moving gripping members 19, 100 towards each other, the core slots 60 can have any angular orientation in relation to axis 107 of gripper apparatus 10. The workstation to which apparatus 10 is transferring the armature for processing may require that core slots 60 be positioned with a predetermined angular orientation, so that various operations such as winding, commutator placing and others can be correctly carried out.

In an assembly line producing different variations of armature, the number of core slots 60 can vary for each variation of armature to be processed. This means that the angular spacing between adjacent slots 60, which is usually the same for all the slots of a particular armature, can vary when changing the type of armature. Therefore, gripper apparatus 10 according to the invention must be capable of orienting all possible slot combinations that can be foreseen.

Correct angular indexing requires that one of slots 60 of the armature core 61 be positioned along a predetermined angular reference line in relation to the center of gripper apparatus 10 or to an axis such as axis 107.

Figure 6:
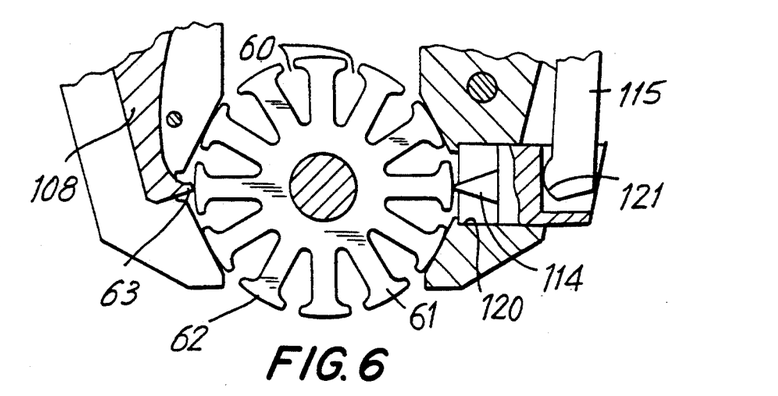
FIGS. 6-8 are fragmentary side elevational view of the gripper apparatus of FIGS. 1-5, taken from the same direction as FIG. 1 and showing different stages of indexing of an armature.

When an armature core 61 is being gripped and centered by gripper apparatus 10, the external surface 62 of core 61 comes into contact with the protruding pawl 108 and index sensing tooth 114. As seen in FIG. 6, as apparatus 10 continues to close, both of these members retract away from armature core 61 (pawl 108 will swivel about pin 44 against the biasing action of spring 46, while index sensing tooth 114 will slide in bore 53, thereby rotating lever 115 which then clears proximity sensor 54). If index sensing tooth 114 falls into a slot 60 instead of contacting external surface 62 of core 61 as previously described, then indexing will not have to be carried out, because, by chance, the armature will have been supplied with the slots in the required angular orientation dictated by index sensing tooth 114. A situation of this type is signalled by proximity sensor 54 because lever 115 does not rotate to clear it.

The extent of closure of the gripping member 19, 100, and thus the degree to which the armature has been gripped, can be measured by connecting a linear potentiometer (not shown) to pin 34. This potentiometer supplies an input to a programmable control (not shown) of gripper apparatus 10, which controls the indexing operation. Alternatively, a pair of proximity sensors (not shown) could be provided, along with a cam or extension on pin 34. The length of the cam or extension would depend on the range of sizes of the core to be gripped. One proximity sensor would sense the cam or extension with gripping members 19, 100 in their maximum open position. The other proximity sensor would sense the cam or extension with gripping members 19, 100 firmly on the core. If the control receives signals from the first sensor, then from the second sensor, and then from neither sensor, that would indicate that gripping members 19, 100 had closed with no core present.

Figure 7:
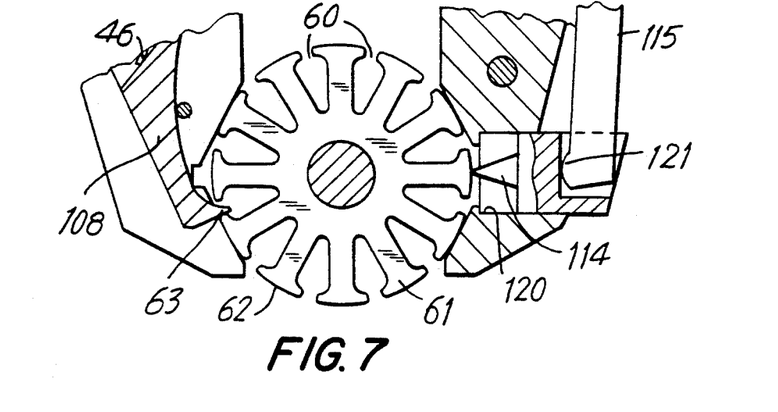

Once the armature has been centered and gripped, piston 110 can be actuated to extend shaft 111 and therefore move pawl 108. During such movement, the pawl tip 63 runs on the core surface until it falls into a slot 60. Further extension of shaft 111 while pawl tip 63 is engaged in core slot 60 causes armature core 61 to rotate about axis 15.

Figure 8:
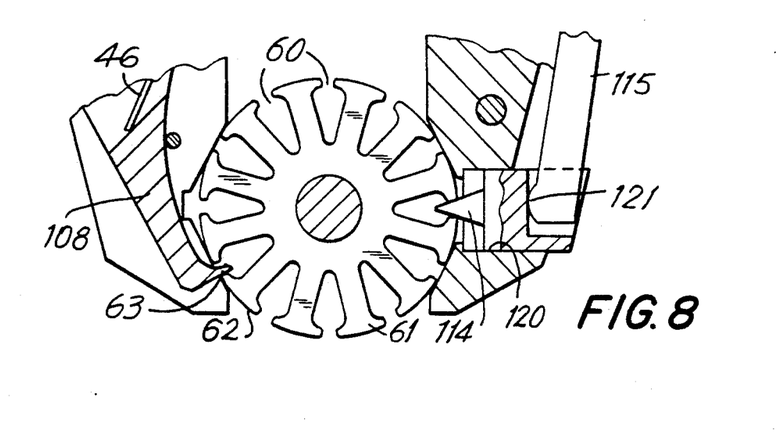

At the same time that armature core 61 is being rotated by means of pawl 108, index sensing tooth 114 runs on external surface 62 of core 61 until it falls into a slot 60. Once this occurs, the rotation of armature core 61 under the driving action of the pawl 108 is stopped by engagement of the index sensing tooth 114 with the dove tail sides of slot 60. This indicates that the required indexing has been accomplished, i.e., one of core slots 60 will have been positioned on the required angular reference line which is dictated by indexing tooth 114.

As soon as indexing tooth 114 has moved into slot 60, end 122 of lever 115 clears proximity switch 54, providing a signal for disengaging the mechanism actuating pawl 108. Shaft 111 retracts, and pawl 108 returns to its rest position under the action of spring 46. As discussed above, pin 47 bears on a surface of pawl 108 to control the return of pawl 108 to its rest position. In particular, pin 47 assures that pawl tip 63 moves away from the surface of core 61 so as not to interfere with the discharge of core 61 from apparatus 10. The signal from switch 54 also initiates further operations as may be required after indexing, e.g., robot movement in order to align and deliver the armature core 61 to the processing machine at the workstation.

It should be noted that tooth 114 will travel different distances into slots 60, depending on the width and length of tooth 114 and on the width and depth of slots 60. In some cases, depending on the dimensions, it may be necessary to provide a cam or extension (not shown) on end 122 to assure that proximity switch 54 can detect end 122 at the appropriate times. At the same time, care must be taken in selecting the cam size to assure that proximity switch 54 does not detect end 122 when it should not—e.g., when there is no core present or when tooth 114 is retracted.

Figure 9:
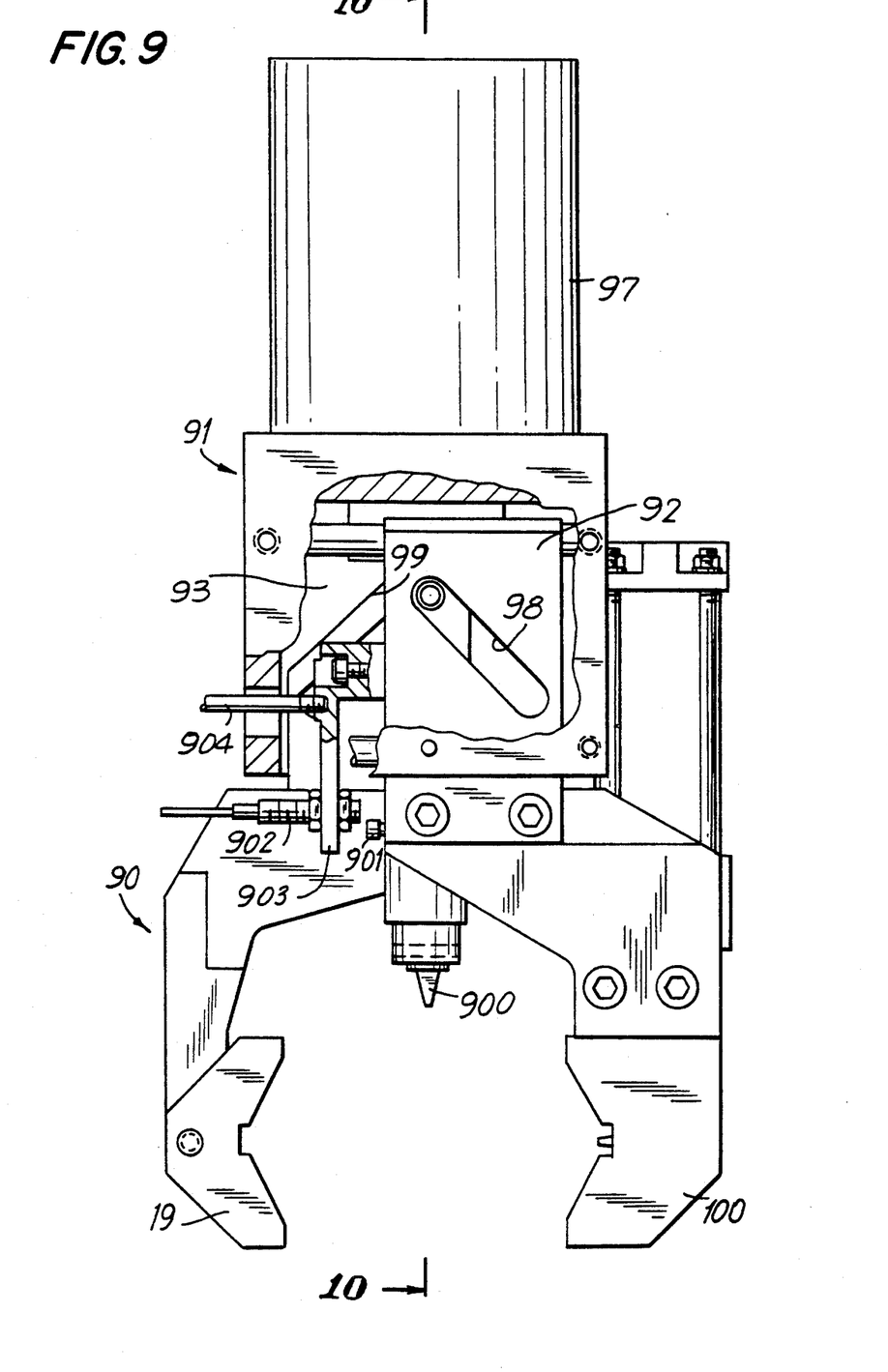
FIG. 9 is a side elevational view, partly in section, of a second preferred embodiment of gripper apparatus according to the present invention, taken along the direction of the longitudinal axis of an armature to be gripped.
Figure 10:
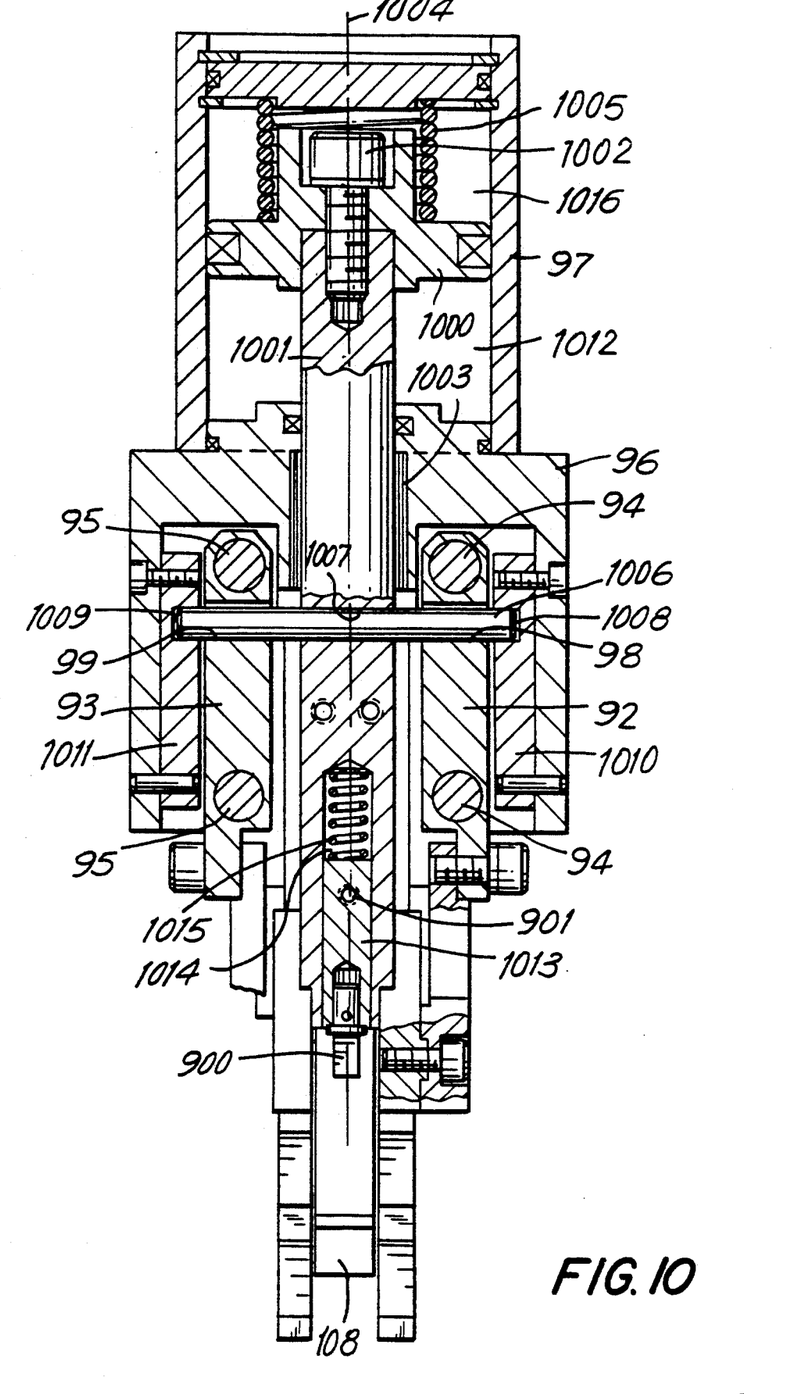
FIG. 10 is a vertical cross-sectional view of the gripper apparatus of FIG. 9, taken from line 10—10 of FIG. 9.

FIGS. 9 and 10 show a second embodiment of gripper apparatus 90 according to the invention, in which the indexing mechanism 91 is not carried by gripping member 100 but by the means for moving gripping member 100. This embodiment includes a slide 92 connected to gripping member 19 and a further slide 93 connected to gripping member 100. The slides are mounted on respective guide bars 94, 95 supported at their extremes by casing 96. Gripping member 19 includes a pawl mechanism which is substantially identical to the one described in connection with the embodiment of FIGS. 1-8.

A cylinder 97 having piston 1000 is mounted on casing 96. Shaft 1001 is connected by means of bolt 1002 to piston 1000. Shaft 1001 is supported in bushing 1003 so that it can translate along axis 1004 when precompressed spring 1005 biases piston 1000 downwards.

Pin 1006 is mounted in a forced fit in transverse bore 1007 of shaft 1001. Pin 1006 passes through inclined slots 98, 99 of slides 92, 93. The tips of pin 1006 are engaged and guided by inclined slots 1008, 1009 of guide members 1010, 1011, which are fixed relative to casing 96 (e.g., by means of bolts and pins).

When chamber 1016 is pressurized and chamber 1012 is depressurized, the combined action of the air pressure and spring 1005 extends shaft 1001 along axis 1004. This extension of shaft 1001 causes pin 1006 to slide in inclined slots 98, 99 of slides 92, 93. As it slides, pin 1006 pushes slides 92, 93 towards each other (slots 98, 99 are oppositely inclined relative to each other in order to achieve this result). This causes gripping members 19, 100 to center and grip armature core 61. As described above in connection with the embodiments of FIGS. 1-8, the spring constant of spring 1005 is chosen so that core 61 remains gripped even if air pressure is lost, and the amount of air pressure supplied is then chosen so that the combined force causes gripping members 19, 100 to grip core 61 securely, but not so tightly that core 61 cannot be rotated.

Index sensing tooth 900 is carried by a cursor 1013 which is slidably seated in a bore 1014 of shaft 1001. In addition to causing gripping members 19, 100 to move toward each other, extension of shaft 1001 also pushes index sensing tooth 900 into contact with surface 62 of core 61 and causes tooth 900 to partially retract within bore 1014 of shaft 1001.

The angles of slots 98, 99 must be chosen with consideration given to the sizes of armatures to be worked on. The angle must not be so steep that in order to grip armature core surface 62, shaft 1001 must touch armature core surface 62. This would interfere with rotation of the armature core as well as with operation of tooth 900. It may also damage shaft 1001. The angle also must not be so shallow that gripping members 19, 100 cannot be brought close enough together. Ideally, the end of shaft 1001, and of bore 1014 and cursor 1013, should always be the same distance from core surface 62.

Precompressed spring 1015 biases cursor 1013 and therefore tooth 900 towards armature core 61 in order to maintain tooth 900 in contact with core surface 62 and to push it into a slot 60 when the final index position is reached under the driving action of pawl 108.

Pin 901 fixed to cursor 1013 engages a proximity switch 902 carried by bracket 903 which is fixed to shaft 1001 whenever index sensing tooth 900 is sufficiently extended, such as when it enters a core slot. In this condition, pin 901 engages proximity switch 902 to provide a signal. This signal is used after gripping has occurred, and the tooth enters core slot 60, to disengage the mechanism activating pawl 108 and to allow any operations that follow indexing to be carried out. When index sensing tooth 900 is completely extended (i.e., falls into a slot 60 at least as wide as the maximum width of tooth 900, or is not in contact with core surface 62), pin 901 abuts against a stop and limits the excursion of cursor 1013 under the biasing action of spring 1015. As stated above in connection with the first embodiment, a cam or extension on pin 901 may be necessary to assure that switch 902 detects pin 901 when it should, while not causing pin 901 to be detected when it should not be.

Pin 904 fixed to bracket 903 can be connected to a linear potentiometer, as described in connection with the embodiment of FIGS. 1-8, which signals the system controls when the required gripping position has been reached for a predetermined core size. Alternatively, as discussed in connection with the embodiment of FIGS. 1-8, two proximity sensors cooperating with an approximate cam or extension mounted on pin 904 could perform this function.

Figure 11:
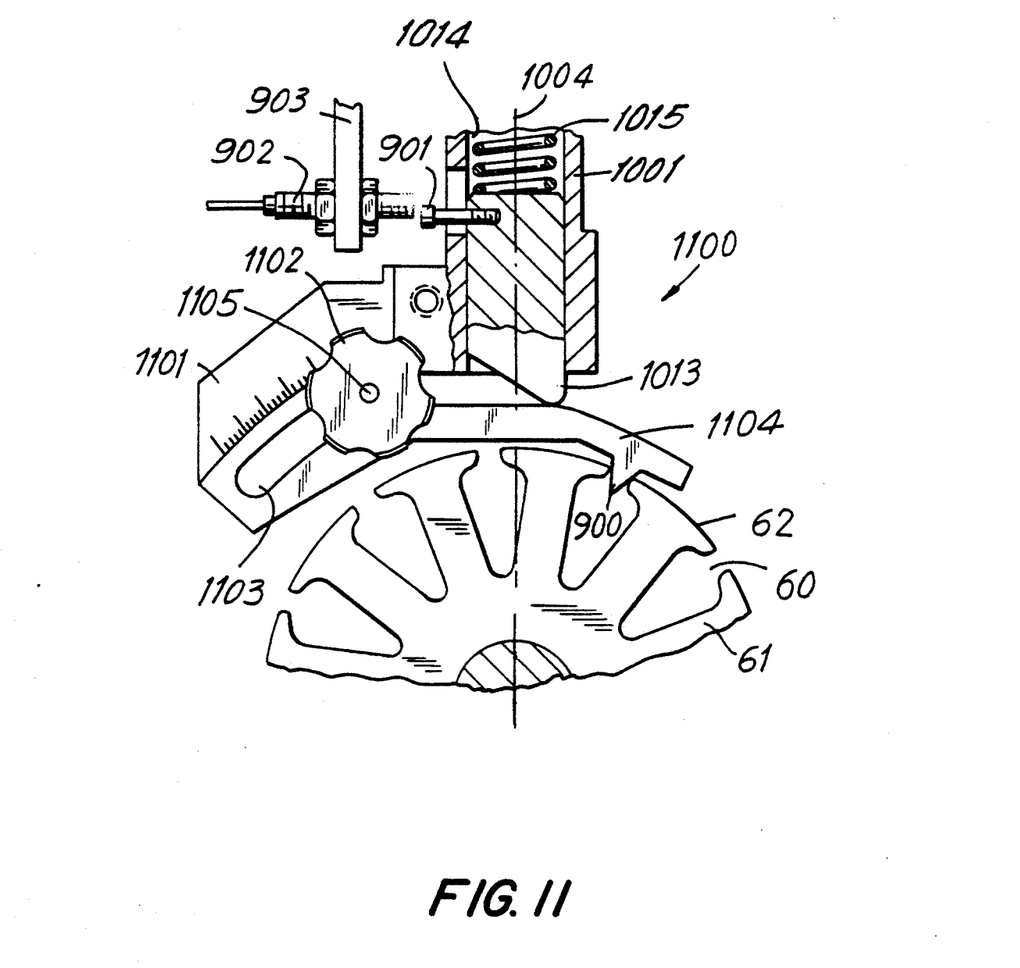
FIG. 11 is a fragmentary elevational view of gripper apparatus according to the present invention showing optional angular adjustment means.

FIG. 11 shows a modification which can be used with the embodiment of FIGS. 9 and 10. This modification is a mechanism 1100 for changing the angular position of index sensing tooth 900 in order to obtain orientations of core slots 60 with an angular shift relative to an axis such as axis 1004. This modification may be required in a commutator placing operation where the relative angle between the commutator and core 61 can vary from armature to armature, even with armatures of the same size. The modification allows such variations to be dealt with without complex orientation mechanisms in the commutator placing equipment.

Mechanism 1100 can be applied to the apparatus of FIGS. 9 and 10 without modifications to the underlying apparatus. According to the modification, shaft 1001 continues to have bore 1014 for seating spring 1015, which biases a moveable cursor 1013. Shaft 1001 carries a support bracket 1101 in which a shaft 1105 of knob 1102 is journalled. The shaft of knob 1102 can be moved in a precisely machined arcuate slot 1103 of bracket 1101 in order to change its angular position relative to axis 1004. An arm 1104 carrying index sensing tooth 900 is hinged to shaft 1105 of knob 1102 so that tooth 900 can move toward and away from armature core 61. Cursor 1013 engages arm 1104 in order to maintain index sensing tooth 900 in contact with armature core 61 or for pushing it into an aligned slot 60 of core 61. By moving shaft 1105 of knob 1102 along slot 1103, tooth 900 can be precisely positioned relative to axis 1004 in order to shift the angular position of index sensing tooth 900 and thereby to obtain a desired predetermined angular shift.

Thus, it is seen that apparatus according to the present invention, having the indexing mechanism as part of the gripper, avoids the need for costly indexing equipment which would have to be provided as part of the processing machine, and which thus would require a custom design to adapt it to the specific machine.

Apparatus according to the invention is also seen to allow indexing while the armature is being transferred, rather than waiting until transfer is complete before beginning angular orientation.

A further advantage of the indexing mechanism according to the invention is that tooth 114 or 900 engages the inside of armature slot 60, providing a positive safety stop. The mechanism also provides a sensor which signals when the stop is engaged, thereby doubling as a safety mechanism.

It should be noted that while in both apparatus 10 and apparatus 90, pawl 108 is used to rotate core 61 relative to the apparatus, it is also possible to provide a mechanism for rotating at least a portion of apparatus 10 or 90 with tooth 114 or 900 relative to core 61. In such an embodiment, illustrated in FIG. 12, the apparatus would rotate in one direction until the tooth enters a slot 60. The apparatus would then stop, lock onto core 61, and rotate in the other direction about the axis of core 61 back to its initial position.

As seen in FIG. 12, apparatus 1200 again includes gripping members 19, 100 similar to those in the embodiment of FIGS. 1–8, except that here gripping member 19 lacks pawl 108 and arrangement 41 for actuating pawl 108. Gripping member 19 is attached to slide 1201 which is similar to slide 20 and is connected to actuation means, located inside casing 1202, similar to that shown in connection with the embodiment of FIGS. 1–8. It should be noted that slide 21 is similarly connected (see FIG. 3), but that connection is cut away in FIG. 1 to show the detail of arrangement 41.

Figure 12:
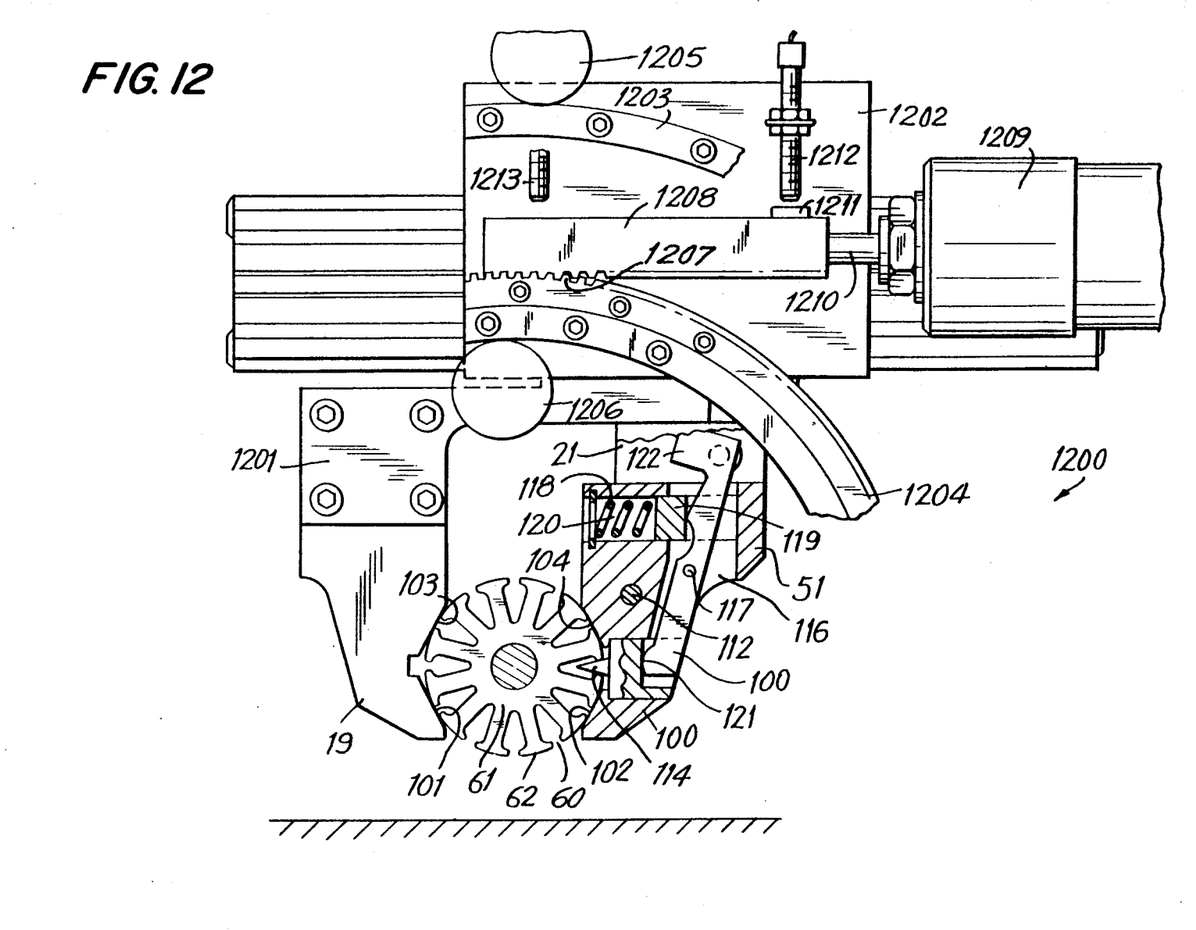
FIG. 12 is a side elevational view, partly in section, of a third preferred embodiment of gripper apparatus according to the present invention, taken along the direction of the longitudinal axis of an armature to be gripped.

Arcuate rails 1203, 1204 are affixed to the exterior of casing 1202 and ride along wheels 1205, 1206 (and other wheels not shown arranged along an arcuate path) affixed to an external frame (not shown). Gear teeth 1207 on rail 1204 mesh with complementary teeth on gear rack 1208, which can move back and forth horizontally under the action of actuator 1209.

Gripping members 19, 100 are closed on armature core 61 as described in connection with the embodiment of FIGS. 1–8. As there, here gripping members 19, 100 close on core 61 securely, but not so tightly that core 61 cannot be rotated within V-shaped surface 101–104. In addition, because here the mechanism will be rotated instead of the core, a means (not shown) is provided to lock armature shaft 12 to prevent accidental rotation of core 61 along with the mechanism. Such locking means might be part of seats 13.

If when gripping members 19, 100 close index sensing tooth 114 by chance immediately enters a slot 60, then no rotation is required. That condition is signalled by proximity switch 54, and the next step in processing armature 11 is initiated. In most cases, however, index sensing tooth 114 will initially contact surface 62, which again will be signalled by proximity switch 54. As a result, shaft 1210 would be extended by actuator 1209, causing rack 1208 to engage teeth 1207 to rotate apparatus 1200 counterclockwise. Rotation continues until tooth 114 enters a slot 60.

When tooth 114 enters a slot 60, that condition is signalled by switch 54, which stops actuator 1209. Armature shaft 12 is then unlocked, and gripping members 19, 100 grip core 61 more tightly. Actuator 1209 then retracts shaft 1210 and rack 1208, returning apparatus 1200 to its original orientation, as signalled by the interaction of pad 1211 and proximity switch 1212. A further proximity switch 1213 serves as a failsafe device, stopping actuator 1209 in the extraordinary case where no armature is present between gripping members 19, 100, but actuator 1209 is nevertheless engaged.

The length of the stroke of shaft 1210 and of rack 1208 are functions of the maximum rotation angle, which depends on the maximum expected angle between slots 60 and on the maximum expected diameter of core 61.

Thus, it is seen that gripper apparatus for electric motor components that can be used to grip components of different sizes, and that can rotationally index electric motor components of different sizes, is provided. One skilled in the art will appreciate that the present invention can be provided by other than the described embodiments, which are presented for purposes of illustration and not of limitation, and the present invention is limited only by the claims which follow.

What is claimed is:

1. Gripper apparatus for gripping an electric motor component, said component having an axis, a surface, and at least one depression in said surface, said gripper apparatus further being for rotationally indexing said component about said axis, said gripper apparatus comprising:

first and second gripper arms for contacting said component surface parallel to said component axis, each of said gripper arms having a gripper surface shaped for contacting said component surface to prevent translation of said component, at least one of said gripper arms being movable toward and away from the other of said gripper arms;

means for moving said at least one of said gripper arms for causing said gripper arms to contact said component surface;

indexing means for engaging said component surface and causing rotation of said component about said component axis;

stopping means for stopping rotation of said component by said indexing means after said indexing means has rotated said component to a desired position; and disengaging means associated with said stopping means for disengaging said indexing means when said stopping means stops said rotation.

2. The gripper apparatus of claim 1 wherein said first and second gripper arms are shaped for securely gripping an armature core.

3. The gripper apparatus of claim 1 wherein a first one of said gripper arms is fixed and a second one of said gripper arms is movable towards and away from said first gripper arm.

4. The gripper apparatus of claim 1 wherein both of said gripper arms are movable toward and away from each other.

5. The gripper apparatus of claim 1 wherein:
said component has at least two of said depressions; and
said indexing means comprises:
an arm, said arm having a tooth for engaging a second one of said depressions, and
means for moving said arm about said axis, whereby said tooth, engaged in said second one of said depressions, causes said component to rotate about said axis.

6. The gripper apparatus of claim 1 wherein said indexing means is coupled to one of said gripper arms.

7. The gripper apparatus of claim 1 wherein said indexing means is coupled to said means for moving said at least one of said gripper arms.

8. The gripper apparatus of claim 1 wherein said stopping means is coupled to one of said gripper arms.

9. The gripper apparatus of claim 1 wherein said stopping means is coupled to said means for moving said at least one of said gripper arms.

10. The gripper apparatus of claim 1 wherein said stopping means is in a fixed angular position about a line parallel to said axis.

11. The gripper apparatus of claim 1 wherein the angular position of said stopping means with respect to a line parallel to said axis is adjustable.

12. The gripper apparatus of claim 1 wherein said stopping means comprises probe means for engaging said at least one depression when said indexing means rotates said component to a position in which said depression is presented to said probe means.

13. The gripper apparatus of claim 12 wherein said probe means comprises:
a probe element;
a shaft, said probe element being mounted on said shaft adjacent a first end thereof; and
biasing means for biasing said shaft and said probe element toward said component surface.

14. The gripper apparatus of claim 13 wherein:
said disengaging means comprises sensor means associated with said probe means for stopping said indexing means from rotating said component when said probe means engages said depression;
said sensor means comprises a switch; and
said sensor means is mounted adjacent a second end of said shaft for actuation by said shaft.

15. The gripper apparatus of claim 14 wherein:
said switch is a proximity switch;
said sensor means further comprises a lever pivotally mounted adjacent said second end of said shaft; and
said lever is pivoted toward and away from said proximity switch as said shaft moves axially in response to movement of said probe element along said component surface, thereby actuating said proximity switch.

16. The gripper apparatus of claim 1 wherein said disengaging means comprises sensor means associated with said stopping means, for deactivating said indexing means when said stopping means stops said rotation.

17. The gripper apparatus of claim 1 wherein said indexing means causes rotation of said component relative to said gripper apparatus.

18. The gripper apparatus of claim 17 wherein said gripper surface cradles said component, whereby said component may be rotated while gripped by said gripper surface.

19. The gripper apparatus of claim 1 wherein said indexing means rotates at least a portion of said gripper apparatus (a) relative to said component about said component axis in a first direction, and (b) with said component about said component axis in a second direction opposite to said first direction.

20. The gripper apparatus of claim 1 wherein the shape of said gripper surfaces accommodates components of varying sizes as a function of the spacing between said first and second gripper arms.

21. The gripper apparatus of claim 20 wherein said gripper surfaces are concave.

22. The gripper apparatus of claim 20 wherein said gripper surfaces are V-shaped.

23. The gripper apparatus of claim 20 wherein said gripper surfaces comprise camming surfaces for centering said component axis relative to said indexing means.

24. Gripper apparatus for gripping an electric motor component having a component surface, said gripper apparatus accommodating electric motor components of varying sizes and comprising:
first and second gripper arms for contacting said component, each of said gripper arms having a gripper surface shaped for contacting said component surface to prevent translation of said component, at least one of said gripper arms being movable toward and away from the other of said gripper arms;
means for moving said at least one of said gripper arms for causing said gripper arms to contact said component surface;
means for measuring the degree to which said component has been gripped by said gripper arms; and
means actuated by said measuring means for further acting on said component after said component has been gripped by said gripper arms; wherein:
the shape of said gripper surfaces accommodates components of varying sizes as a function of the spacing between said first and second gripper arms.

25. The gripper apparatus of claim 24 wherein said gripper surfaces are concave.

26. The gripper apparatus of claim 24 wherein said gripper surfaces are V-shaped.

27. The gripper apparatus of claim 24 wherein said gripper surfaces comprise camming surfaces for centering said component relative to said gripper arms.

* * * * *